Aug. 26, 1947.　　　K. FISCHER　　　2,426,263
VISCOSIMETER

Filed May 15, 1944

INVENTOR.
KERMIT FISCHER
BY
*Leonard L. Kalish*
ATTORNEY.

Patented Aug. 26, 1947

2,426,263

UNITED STATES PATENT OFFICE 2,426,263

VISCOSIMETER

Kermit Fischer, Bridge Valley, Pa.

Application May 15, 1944, Serial No. 535,626

3 Claims. (Cl. 73—56)

The present invention relates to a certain new and useful method of and apparatus for determining the viscosity of fluids in motion and it relates more particularly to the determination of the viscosity of a fluid while such fluid is in motion, as, for example, while said fluid is passing through a pipe-line.

An object of the present invention is to provide a simple, dependable and accurate method for determining and maintaining a constant check upon the viscosity of a fluid in motion, as, for instance, fluids in transit in industrial chemical processes, without having to remove any of the fluids from the line. A further object of the present invention is to provide dependable and inexpensive apparatus for measuring and maintaining a constant check upon viscosity of fluids in motion, as, for instance, fluids in transit in pipe-lines in industrial chemical plants.

Other objects and advantages of the present invention will be apparent in the following detailed description, appended claims and accompanying drawings.

Heretofore, it has usually been necessary in order to determine the viscosity of a fluid in motion (for example through a pipe-line or the like) to withdraw a sample of the fluid and to test it for viscosity in conventional viscosimeters. It is apparent that these conventional methods were inadequate since it was out of the question to run more than a comparatively few such tests and, therefore, the viscosity of the flowing fluid could never be known with certainty since it might have varied during the intervals.

In my co-pending application Serial No. 368,246 filed December 2, 1940, now U. S. Patent No. 2,348,732, issued May 16, 1944, I disclosed a novel method of and apparatus for determining the viscosity of fluids flowing through a pipe-line or the like by passing the fluid through a rate-of-flow indicating device relatively insensitive to changes in viscosity of the fluid and through another indicating device sensitive to changes in both rate-of-flow and viscosity, the two devices being connected in series, and determining the viscosity by the variations in readings of the two instruments.

More specifically my co-pending application Serial No. 368,246 disclosed a method of, and apparatus for, determining the viscosity of fluids in motion through pipe-lines or the like by passing the fluid through two series-connected variable-orifice rate-of-flow meters of the type commonly known as rotameters; one of the rotameters having a metering float of novel construction whereby its flow-rate-indicating position is relatively independent of and unaffected by variations in viscosity, and the other rotameter having a different-type metering float, the position of which within its metering tube being sensitive to and affected by changes in viscosity as well as in rate-of-flow. The difference in the readings of the two series-connected rotameters disclosed in my co-pending application Serial No. 368,246 gives a constant indication of the viscosity of the flowing fluid and the variations in this difference in readings give a continuous indication of the variations in the viscosity of the flowing fluid from time to time.

My present invention contemplates a further improved method of and apparatus for determining the viscosity of a flowing fluid, whereby such determination can be made more quickly and easily and whereby simplified and less expensive apparatus is required.

Generally speaking, according to my present invention, the viscosity of a flowing fluid can be determined by passing the fluid through a rotameter tube wherein are disposed two separate metering floats; one float being insensitive to and unaffected by variations in viscosity (so that its position is determined solely by the rate-of-flow) and the other float being sensitive to and affected by variations in both viscosity and rate-of-flow. In this way, the viscosity of the flowing fluid can be determined by the difference in the positions of the two metering floats and the variations in the fluid viscosity can be determined by the corresponding variations in the difference of the positions of the two floats.

For the purpose of illustrating the invention, there are shown in the accompanying drawings forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Figure 1:
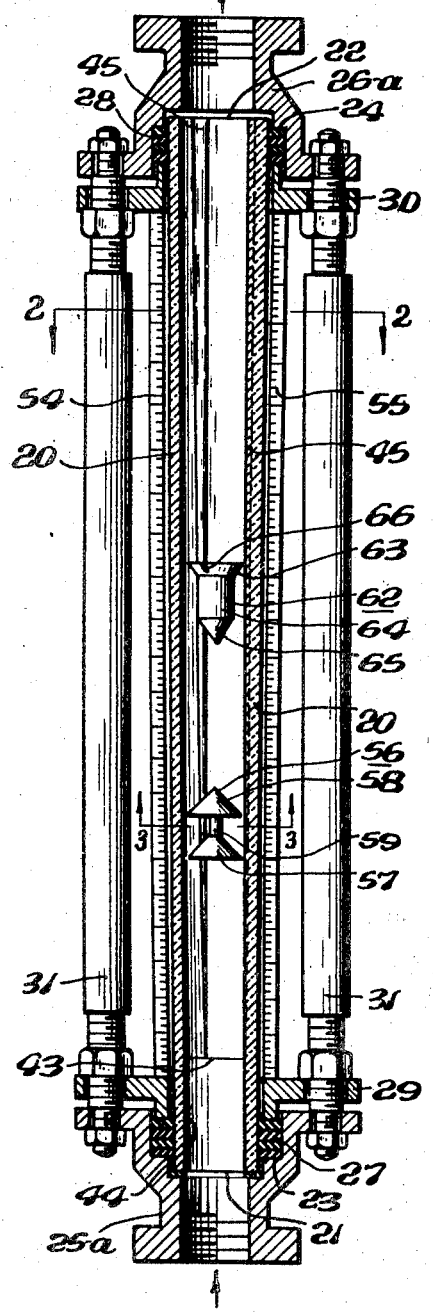
Figure 1 represents a vertical cross-sectional view of one embodiment of the present invention.
Figure 2:
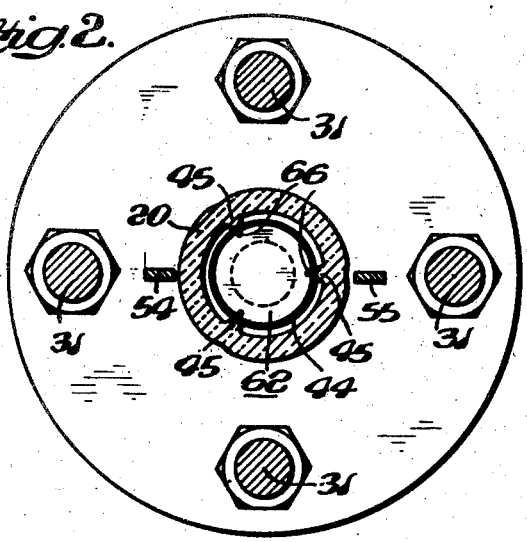
Figure 2 represents a horizontal cross-sectional view, on an enlarged scale, generally along the line 2—2 of Figure 1.
Figure 3:
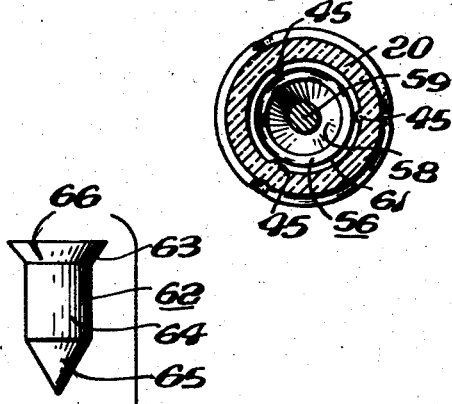
Figure 3 represents a horizontal cross-sectional view, on the same scale as Figure 2, generally along the line 3—3 of Figure 1.
Figure 4:
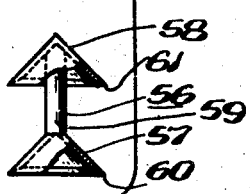
Figure 4 represents a schematic elevational view, on an enlarged scale, of the float assembly of Figure 1, parts being broken away better to reveal the construction thereof.

In Figures 1–4, I have shown one embodiment of the present invention in which I may provide a vertical metering tube 20 (to be hereinafter described in detail) having its lower and upper ends 21 and 22 respectively mounted within the stuffing-boxes 23 and 24 of the lower and upper rotameter "heads" or "fittings" 25—a and 26—a; fluid-tight seals being effected by means of lower and upper packing rings 27 and 28 and lower and upper stuffing-glands 29 and 30. The heads 25—a and 26—a (which are spaced apart by spacing rods or posts 31) are adapted for connection to a lower vertical inlet-line (not shown) and an upper vertical outlet-line (not shown).

The metering tube 20 which, specifically, is the subject of my co-pending application Serial No. 535,624, filed May 15, 1944, is downwardly tapered throughout most of its length, that is from its upper end 22 to the point 43; a cylindrical inner bore 44 being provided at the lower portion of the tube 20, that is from the point 43 to the lower end 21.

A plurality (for example three) of uniformly-circumferentially-spaced inwardly-protruding axially-extending float-guiding beads 45 are provided upon the tapered inner bore of said metering tube 20. The tips of the beads 45 extend generally parallel to the axis of the tube 20 and in direct continuation of the cylindrical inner bore 44. That is, the beads 45 are relatively pronounced at the upper larger end of the tube 20 and gradually become less pronounced downward along the tapered bore of the tube until they fade out completely at the point 43.

As will be hereinafter described, the beads 45 provide parallel float-guiding shoulders or lands which serve to center the metering float along the axis of the tube.

Within the tube 20, I may provide a main metering float 56, which is specifically the subject of my co-pending application Serial No. 535,625, filed May 15, 1944.

The float 56 includes lower and upper flow-constricting concave or conical metering heads 57 and 58 opening toward the lower inlet end 21 of the metering tube 20; the heads 57 and 58 being connected by a thin connecting rod 59 disposed generally axially of said float.

The beveled peripheries 60 and 61 of the lower and upper metering heads 57 and 58 respectively have the same diameter and pass close to the tips of the float-guiding beads 45 as shown particularly in Figure 7; the float 56 being guided thereby along the axis of the tube 20.

As disclosed in my co-pending application Serial No. 535,625, filed May 15, 1944, the double-cone metering float 56 is generally insensitive to and unaffected by variations in fluid viscosity so that its position within the metering tube is determined solely by the rate-of-flow of fluid upwardly through said tube.

Within the metering tube 20 I may also provide a secondary float 62. The secondary float 62 is of conventional top-shaped construction and is provided with an uppermost flow-constricting head 63, a generally cylindrical body portion 64 and a lowermost tapered tail portion 65. A plurality of inclined notches 66 may be provided on the head 63 to cause the float 62 to rotate about its axis when fluid passes upwardly past the periphery of said head.

The secondary float 62, which is of the dynamically-stable self-centering type, is sensitive to and affected by variations in fluid viscosity.

Thus, as described hereinabove, the secondary float 62 will rise higher within the metering tube 20 than will the main float 56 due to the lifting force exerted by the viscosity-effect.

As is well known in the art, a rotameter float (when used in an up-stream of fluid) must have some negative buoyancy (that is, it must have a specific gravity somewhat greater than that of the fluid). Thus, when there is no fluid flow, the float will remain at the bottom of the metering tube and, when flow starts, will be raised proportionately to the rate of such flow.

In order that the secondary float 62 be, at all measurable flow-rates, somewhat above the main float 56, I prefer to make the secondary float slightly less in specific gravity than the main float. Since the height to which the rotameter float is raised within a given metering tube of vertically-varying cross-sectional area is dependent upon the extent of its negative buoyancy, it is apparent that the lighter secondary float 62 will be raised to a higher position within the metering tube 20 at any given flow-rate than would the main float 56, regardless of the viscosity effect upon the secondary float. Thus, there is always some clearance between the secondary float and the main float so that neither will be displaced from its true position by the other.

Separate scales 54 and 55 are provided for the two floats respectively; the position of one float being read off against one of the scales while the position of the other float is read off against the other of the scales.

It is apparent that the difference in readings of the two floats (as read off against their respective scales) will be an indication of the viscosity of the flowing fluid and that variations in this difference will be an indication of corresponding variations in the viscosity.

The present invention may be embodied in other specific forms without departing from the spirit or essential attributes thereof, and it is therefor desired that the present embodiments be considered in all respects as illustrative and not restrictive, reference being had to the appended claims rather than to the foregoing description to indicate the scope of the invention.

Having thus described the invention, what I claim as new and desire to protect by Letters Patent is:

1. A device for determining the viscosity of a moving fluid which comprises a downwardly-tapered metering tube adapted for upward flow of fluid therethrough, a metering float disposed within said tube and adapted for up-and-down movement therewithin responsive to variations in fluid rate-of-flow, said float being relatively insensitive to variations in fluid viscosity, and having at least two axially-spaced flow-constricting head portions and an intervening reduced-diameter connecting portion, and a second metering float disposed within said tube above said first-mentioned float, said second float being sensitive to variations in both rate-of-flow and viscosity, said tube being provided with a plurality of circumferentially-spaced inwardly-protruding axially-extending beads providing parallel line-contacts for float guidance.

2. A device for determining the viscosity of a moving fluid comprising a vertical metering tube having vertically-varying cross-sectional area available for vertical flow of fluid therethrough, a metering float disposed within said tube and adapted for up-and-down movement therewithin, responsive to variations in fluid rate-of-flow, said float being relatively insensitive to variations in fluid viscosity and having at least two axially-spaced flow-constricting head portions and an intervening reduced-diameter connecting portion, and a second metering float disposed within said tube, said second float being sensitive to variations in both rate-of-flow and viscosity and being disposed nearer the outlet end of said tube, said tube being provided with a plurality of circumferentially - spaced inwardly - protruding axially-extending beads providing parallel line-contacts for float guidance.

3. A device for determining the viscosity of a moving fluid comprising a vertical metering tube having vertically-varying cross-sectional area available for vertical flow of fluid therethrough, a metering float disposed within said tube and adapted for up-and-down movement therewithin, responsive to variations in fluid rate-of-flow, said float being relatively insensitive to variations in fluid viscosity and having at least two axially-spaced flow-constricting head portions and an intervening reduced-diameter connecting portion, said head portions being in the form of concave fluid-entrapping pockets opening toward the inlet end of said tube, and a second metering float disposed within said tube, said second float being sensitive to variations in both rate-of-flow and viscosity and being disposed nearer the outlet end of said tube, said tube being provided with a plurality of circumferentially-spaced inwardly-protruding axially-extending beads providing parallel line-contacts for float guidance.

KERMIT FISCHER.

REFERENCES CITED

The following references are of record in the file of this patent:

UNITED STATES PATENTS

| Number | Name | Date |
| --- | --- | --- |
| 2,252,883 | Everson | Aug. 19, 1941 |
| 2,348,732 | Fischer | May 16, 1944 |
| 1,631,746 | Luckey | June 7, 1927 |
| 2,028,186 | Booth | Jan. 21, 1936 |
| 2,311,375 | Farwick | Feb. 16, 1943 |
| 2,321,041 | Porter | June 8, 1943 |

FOREIGN PATENTS

| Number | Country | Date |
| --- | --- | --- |
| 851,326 | France | Oct. 2, 1939 |